United States Patent
Polido et al.

(10) Patent No.: US 11,912,513 B1
(45) Date of Patent: Feb. 27, 2024

(54) ROBOTIC SYSTEM CAMERA CALIBRATION AND LOCALIZATION USING ROBOT-MOUNTED REGISTERED PATTERNS

(71) Applicant: Amazon Technologies, Inc., Seattle, WA (US)

(72) Inventors: Felipe De Arruda Camargo Polido, North Reading, MA (US); Sanjeev Khanna, Boston, MA (US); Steven Alexander Viola, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 17/230,333

(22) Filed: Apr. 14, 2021

(51) Int. Cl.
| | |
|---|---|
| *B25J 13/08* | (2006.01) |
| *B25J 9/16* | (2006.01) |
| *B25J 15/06* | (2006.01) |
| *B65G 47/91* | (2006.01) |

(52) U.S. Cl.
CPC .......... *B65G 47/917* (2013.01); *B25J 9/1692* (2013.01); *B25J 9/1697* (2013.01); *B25J 13/088* (2013.01); *B25J 15/065* (2013.01); *B65G 47/918* (2013.01); *B65G 2203/0283* (2013.01); *B65G 2203/041* (2013.01)

(58) Field of Classification Search
CPC ................ B65G 47/917; B65G 47/918; B65G 2203/0283; B65G 2203/041; B25J 9/1692; B25J 9/1697; B25J 13/088; B25J 15/065

See application file for complete search history.

(56) References Cited

U.S. PATENT DOCUMENTS

| | | | | |
|---|---|---|---|---|
| 2010/0141776 | A1* | 6/2010 | Ban | G06T 7/80 348/E17.002 |
| 2011/0280472 | A1* | 11/2011 | Wallack | G06T 7/80 901/14 |
| 2015/0025683 | A1* | 1/2015 | Amano | B25J 9/1692 700/254 |
| 2017/0132807 | A1* | 5/2017 | Shivaram | B25J 9/1692 |
| 2017/0365501 | A1* | 12/2017 | Ng | G01L 27/002 |
| 2020/0023521 | A1* | 1/2020 | Dan | B25J 9/1692 |
| 2020/0082230 | A1* | 3/2020 | Hoelscher | G06T 7/75 |
| 2020/0262080 | A1* | 8/2020 | Ghobadi | B25J 9/1697 |

(Continued)

FOREIGN PATENT DOCUMENTS

| | | | | |
|---|---|---|---|---|
| CN | 210525078 | U * | 5/2020 | |
| DE | 102018213499 | A1 * | 2/2020 | B25J 18/00 |
| JP | 6816454 | B2 * | 1/2021 | |

*Primary Examiner* — Adam R Mott
*Assistant Examiner* — Heather J Keniry
(74) *Attorney, Agent, or Firm* — Eversheds Sutherland (US) LLP

(57) ABSTRACT

Systems, methods, and computer-readable media are disclosed for robotic system camera calibration and localization using robot-mounted registered patterns. In one embodiment, an example robotic system may include a robotic manipulator, and a picking assembly coupled to the robotic manipulator, where the picking assembly is configured to grasp and release items, and where the picking assembly includes a housing having a first flat surface. Example robotic systems may include a first calibration pattern disposed on the first flat surface of the housing, a first camera configured to image the first calibration pattern, and a controller configured to calibrate the robotic system.

17 Claims, 9 Drawing Sheets

(56) References Cited

U.S. PATENT DOCUMENTS

| | | | |
|---|---|---|---|
| 2020/0282575 A1* | 9/2020 | Haeusler | B25J 9/1612 |
| 2021/0053230 A1* | 2/2021 | Mizoguchi | B25J 9/1697 |
| 2021/0241491 A1* | 8/2021 | Islam | B25J 9/1697 |
| 2021/0291376 A1* | 9/2021 | Wang | B25J 9/1692 |
| 2022/0147026 A1* | 5/2022 | Poelman | B25J 9/1692 |

* cited by examiner

ROBOTIC SYSTEM CAMERA CALIBRATION AND LOCALIZATION USING ROBOT-MOUNTED REGISTERED PATTERNS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
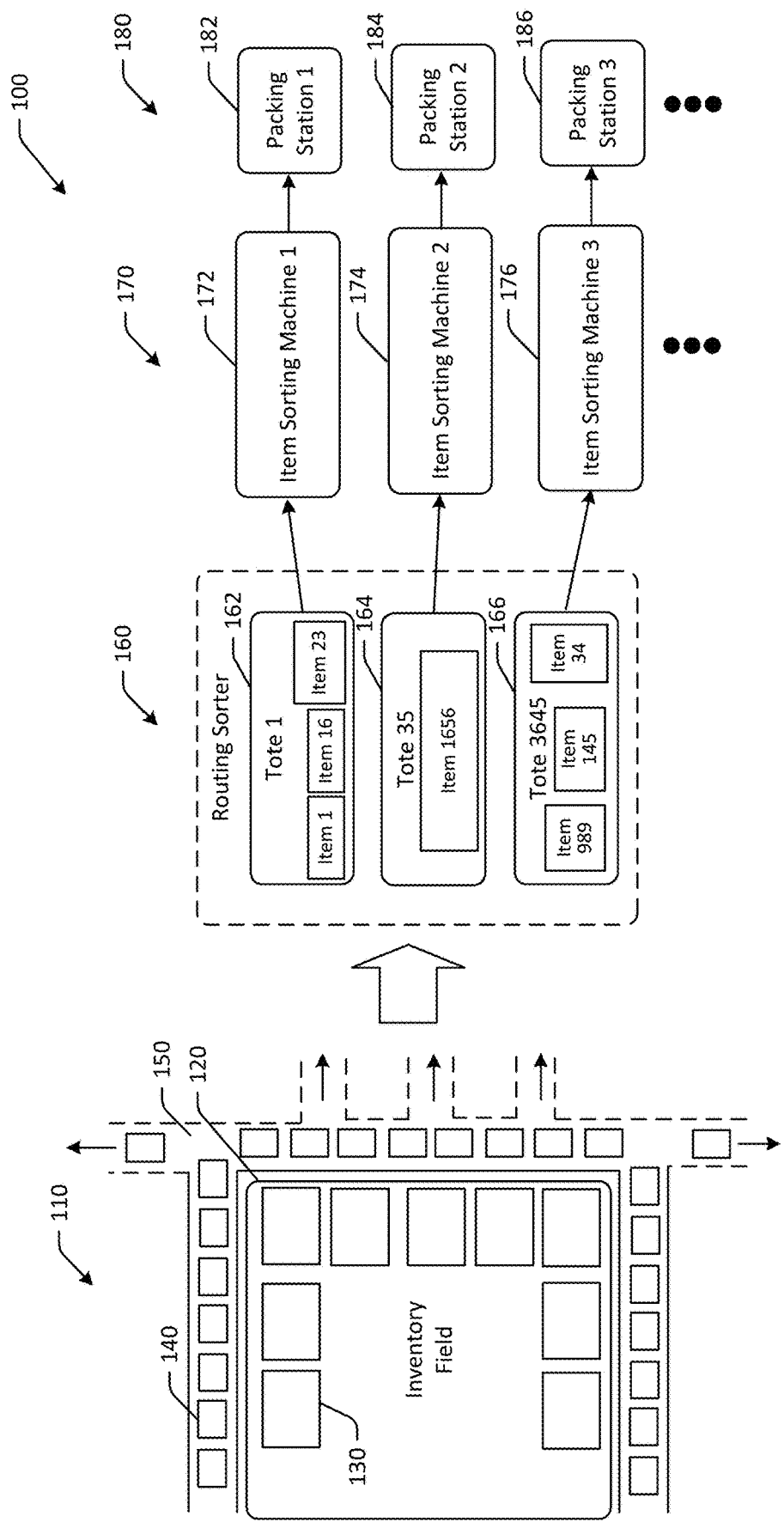
FIG. 1 is a hybrid schematic illustration of an example use case for robotic system camera calibration and localization using robot-mounted registered patterns and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

OVERVIEW

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Further, once all of the items in an order are aggregated (for single item or multi-item orders), the items may be placed into boxes for shipping. The boxes may then be loaded onto trucks or other forms of transport. Humans may be able to manually handle individual items, including packages, with ease. However, robotic handling of individual items may require various levels of dexterity. In addition, using a robot or other machine to grasp an item in a cluttered environment, such as a box or tote with multiple items inside, may be difficult to achieve reliably using mechanical systems.

To accurately grasp items from a first container, move the item to a second container, and then release the item using a robotic manipulator, such as a robotic arm, robotic precision of a number of millimeters may be needed. In some instances, positioning precision or accuracy of 5 millimeters or better may be needed for optimal performance, where the accuracy represents an actual robotic position compared to where the robot should actually be. For example, a target pick point on an item may have a radius of 2.5 millimeters, where the item is to be grasped using an end of arm tool, such as a picking assembly or other end of arm tool, coupled to a robotic arm. Accordingly, the robotic arm must position the picking assembly within the target pick point or region to optimally grasp and/or handle the item.

Such tight tolerances and high precision requirements may be difficult to satisfy due to continuous factors that may lead to uncalibration of the robotic manipulator. Factors that may negatively impact robotic calibration include vibration transmitted via a ground surface and/or other robots or machinery in the vicinity, changes in ambient light that impact camera performance (where cameras are used to determine pick points on items, track robotic movement, and/or other functions, etc.), vibration caused by factors external to a facility (e.g., heavy trucks moving at a loading dock, etc.), moving heavy items using robotic manipulators and/or picking assemblies (e.g., 40 pound bags of cat food, etc.), and other factors. These factors and others can lead to uncalibration of a robotic manipulator, which may then result in misplacement of end of arm tools, such as picking assemblies, which may then lead to suboptimal performance of the robotic system, such as increased items that are dropped by the picking assembly, items that are not grasped during a first attempt, items that are not released at the proper destination location, and so forth.

Moreover, in instances where a robotic manipulator does not merely repeat the same function or same set of functions, calibration can be even more critical. For example, in environments where the robotic system may be used to grasp and move items of drastically different sizes and weights in succession (e.g., first a quarter pound rectangular box of staples, then a 3 pound round basketball, and then a bag of cat food weighing 40 pounds, etc.), a likelihood that the robotic system becomes uncalibrated may increase. This is because the path of movement once the item is grasped can be different for each item, and the robotic system is not simply repeating the same motion or set of motions, but instead is planning a potentially infinite number of paths for the different items based on size, weight, shape, and so forth. Typical calibration processes for robotic systems can take upwards of 15 minutes and can therefore be costly as far as downtime of robotic equipment. Accordingly, calibration of robotic systems in a time saving manner, and potentially without requiring a dedicated calibration process, may be desired.

Embodiments of the disclosure include methods and systems for robotic system camera calibration and localization using robot-mounted registered patterns that may improve processing and fulfillment of orders, or other object aggregation tasks. Certain embodiments include robotic manipulators with picking assemblies that use end of arm tool-mounted registered patterns, which may be in the form of calibration plates, for robotic system camera calibration and localization. Although described in example herein of a calibration "plate," calibration patterns may be in different forms, such as three-dimensional markers coupled directly on an end of arm tool housing, painted markers or other forms of two-dimensional markers applied directly on an end of arm tool housing, thin sheets of material adhered to an end of arm tool housing, and so forth. Some embodiments may be disposed on end of arm tool housings without requiring flat surfaces on which to mount the calibration pattern.

Some embodiments may be configured to complete a dedicated calibration process in less than 5 minutes, and other embodiments may be configured to complete a calibration process while the robotic system remains in use (e.g., with no downtime, etc.). Embodiments may include end of arm tools, such as picking assemblies, in conjunction with vacuum suction to pick up and/or release, or otherwise handle, objects, so as to increase throughput and speed of object handling. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for robotic system camera calibration and localization using robot-mounted registered patterns and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, robotic systems may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote ("tote" as used herein can be any suitable container). Robots at the picking process, or elsewhere within the facility, such as item sortation, item aggregation, item routing, and so forth may be used in conjunction with the robotic system camera calibration and localization using robot-mounted registered patterns described herein.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that implement robotic system camera calibration and localization using robot-mounted registered patterns, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

In some embodiments, contents of totes may be consolidated in a tote consolidation process. For example, items from different totes destined for the same destination in a facility may be aggregated into a single tote. To consolidate the items, items from one or more totes may be removed and placed into another tote. Certain robotic manipulation systems may be configured to perform the tote consolidation process, or to otherwise consolidate items, using a robotic manipulation system. Calibration of the system may be performed as described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, robotic system camera calibration and localization using robot-mounted registered patterns as described herein may be used. As a result, manual effort can be redirected to other tasks, and time savings may be achieved, along with improved robotic performance due to increased calibration.

Example embodiments of the disclosure provide a number of technical features or technical effects. For example, in accordance with example embodiments of the disclosure, certain embodiments of the disclosure may include robotic system camera calibration and localization using robot-mounted registered patterns. Certain embodiments may improve processing speed, throughput, and/or efficiency of fulfillment centers. Certain embodiments may improve performance of mechanical equipment for sortation and/or consolidation of items. While described in the context of online orders, aspects of this disclosure are more broadly applicable to other forms of object handling. While described in the context of online orders, aspects of this disclosure are more broadly applicable to other forms of object handling. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
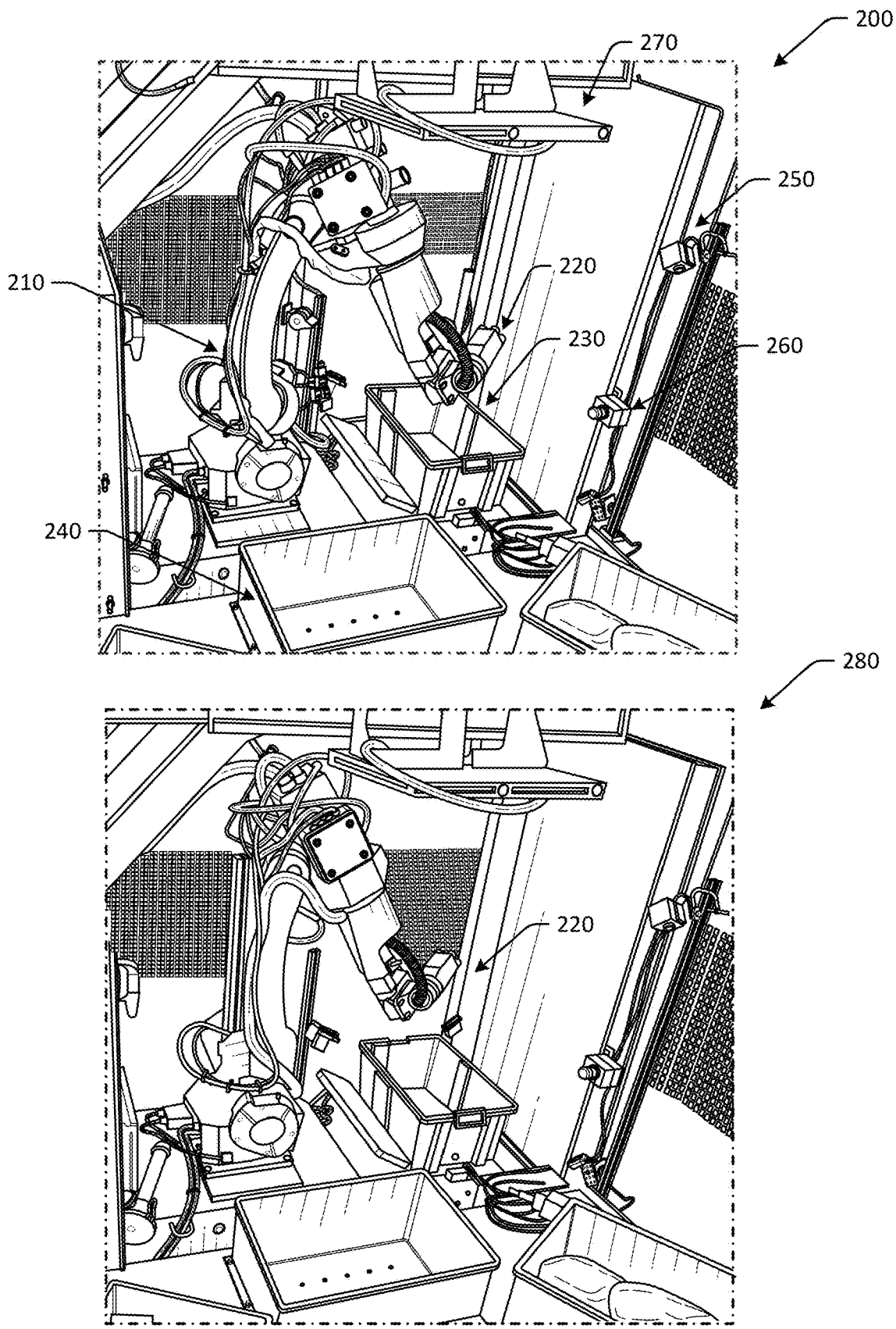
FIG. 2 is a schematic illustration of a robotic system performing camera calibration and localization using robot-mounted registered patterns in accordance with one or more embodiments of the disclosure.

FIG. 2 is a schematic illustration of a robotic system 200 performing camera calibration and localization using robot-mounted registered patterns in accordance with one or more embodiments of the disclosure. Other embodiments may include additional or fewer components. The illustration of FIG. 2 may not be to scale, and may not be illustrated to scale with respect to other figures. The robotic system illustrated in FIG. 2 may be the robotic system discussed with respect to FIG. 1.

The robotic system 200 may include a robotic manipulator 210, such as a robotic arm, a gantry, or other robotic manipulator, that is configured to grasp and move items. For example, the robotic system 200 may be configured to use the robotic manipulator 210 to move items from a first container 230 to a second container 240. To grasp items, the robotic manipulator 210 may be coupled to an end of arm tool, such as a picking assembly 220. The picking assembly 220 may be a suction-based picking assembly, where negative air pressure may be used to secure items to the picking assembly 220, and positive air pressure may optionally be used to release items from grasp. The robotic system 200 may include one or more cameras, such as a first camera 250, a second camera 260, a third camera 270, and so forth. Any number of cameras may be used. The cameras may be oriented at different angles, such as downwards towards the picking assembly 220, upwards towards the picking assembly 220, and/or other orientations. As depicted at a second point in time 280, the robotic manipulator 210 may move the picking assembly 220 from a first location to a second location so as to retrieve an item, transport an item, release an item, calibrate the robotic manipulator 210, and so forth.

Vision-based robotic solutions may rely on known transformations between the robotic manipulator and the cameras on station for calibration. This calibration is extrinsic, and allows for defining of the transformation between multiple cameras and objects, static and dynamic, within a system. Furthermore, different camera systems have a range of features that also require calibration, including lens intrinsic, focus validation, white balance, and color correction.

The robotic system 200 may include integrated position registered markers on the end of arm tool, or picking assembly 220, where the markers may be in the form of one or more calibration plates. This reduces the potential error stack-up as other existing solutions, as a separate calibration plate does not have to be grasped and moved using the end of arm tool. Embodiments also allow for a wider range of camera placements.

Figure 5A:
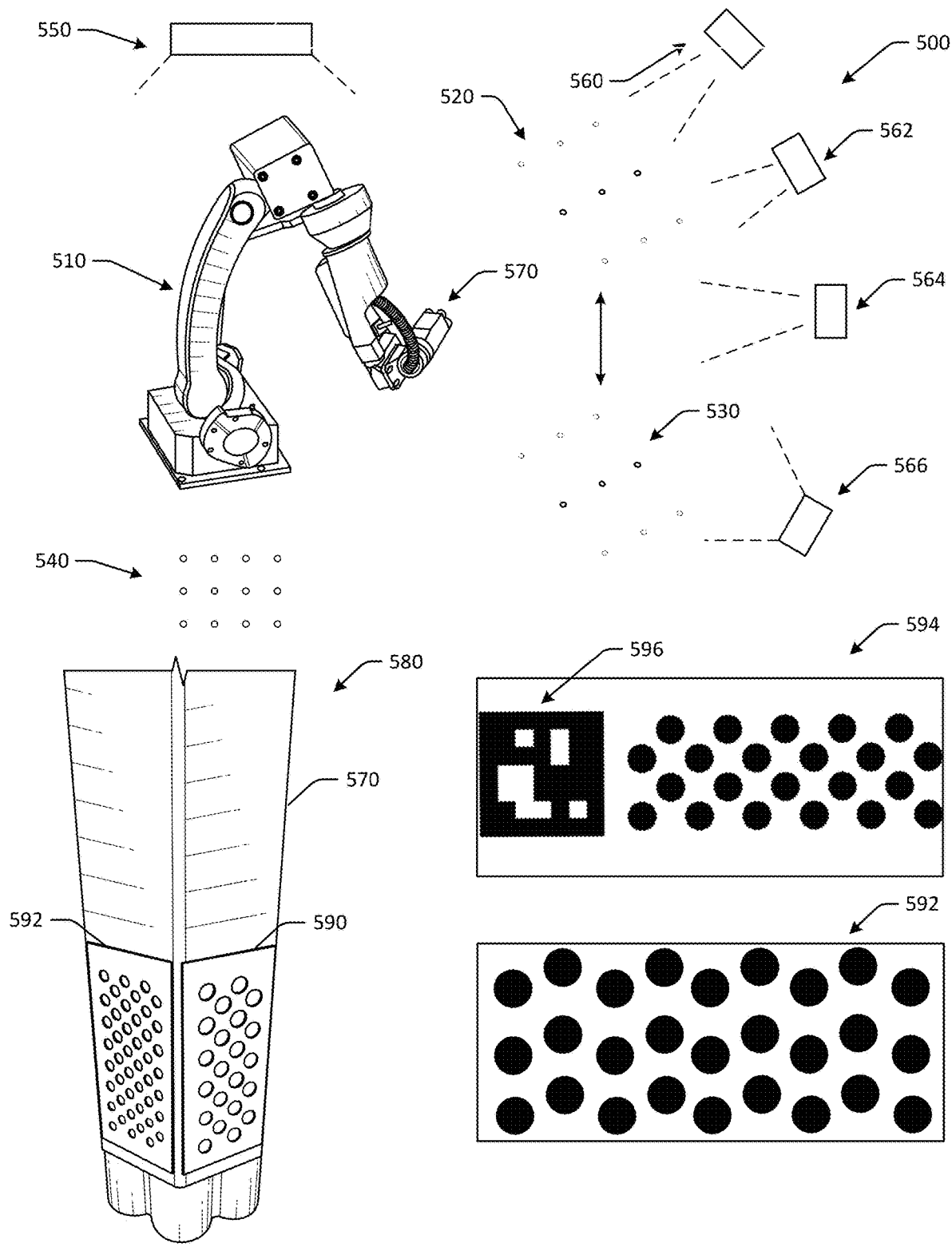
FIG. 5A is a schematic illustration of an example robotic system performing camera calibration and localization using robot-mounted registered patterns, along with example calibration patterns, in accordance with one or more embodiments of the disclosure.

The robotic system 200 may therefore be a robotic system that includes a vacuum suction system configured to provide negative air pressure, the robotic manipulator 220, such as a robotic arm, the picking assembly 220 coupled to the vacuum suction system and the robotic manipulator 220, and the picking assembly 220 configured to grasp and release objects. The picking assembly 220 may include a shell having a hexagonal cross-sectional geometry, such that six flat faces are formed on an external surface of the shell, as depicted in FIG. 5A. The robotic system 200 may include a first calibration plate rigidly mounted to a first face of the shell, the first calibration plate having a first pattern disposed thereon, where the first calibration plate is non-reflective (e.g., formed of a non-reflective material and/or having a non-reflective coating, etc.). The robotic system 200 may include a second calibration plate rigidly mounted to a second face of the shell, the second calibration plate having a second pattern disposed thereon, where the second calibration plate is non-reflective as well. Any number of calibration plates can be included. Calibration plates and patterns are discussed in more detail with respect to FIGS. 5A-5B. The robotic system 200 may include the first camera 250 oriented towards the robotic arm and/or picking assembly 220 at a downwards angle relative to horizontal, and the second camera 260 oriented towards the robotic arm and/or picking assembly 220 at an upwards angle relative to horizontal. The robotic system 200 may include a controller configured to calibrate positioning of the picking assembly.

Although a single picking assembly is illustrated in FIG. 2, in some embodiments, more than one picking assembly may be used in conjunction with each other to pick up objects. For example, some embodiments may include multiple picking assemblies arranged in an array or in a vertically offset arrangement to pick up objects. For example, the picking assembly illustrated in FIG. 2 may be a first picking assembly, and the robotic picking assembly may also include a second picking assembly disposed adjacent to the first picking assembly, and a third picking assembly disposed adjacent to the first picking assembly. The second picking assembly and/or the third picking assembly are in an offset vertical position with respect to the first picking assembly. Such an arrangement may improve the ability of the device to pick up objects with non-uniform surface features. In another example, the picking assembly illustrated in FIG. 2 may be a first picking assembly, and the robotic picking assembly may include a second picking assembly disposed adjacent to the first picking assembly, and a third picking assembly disposed adjacent to the first picking assembly. The second picking assembly and/or the third picking assembly may be arranged around the first picking assembly in a concentric arrangement, a circular arrangement, an elliptical arrangement, an oval arrangement, a rectangular arrangement, and the like.

Figure 3:
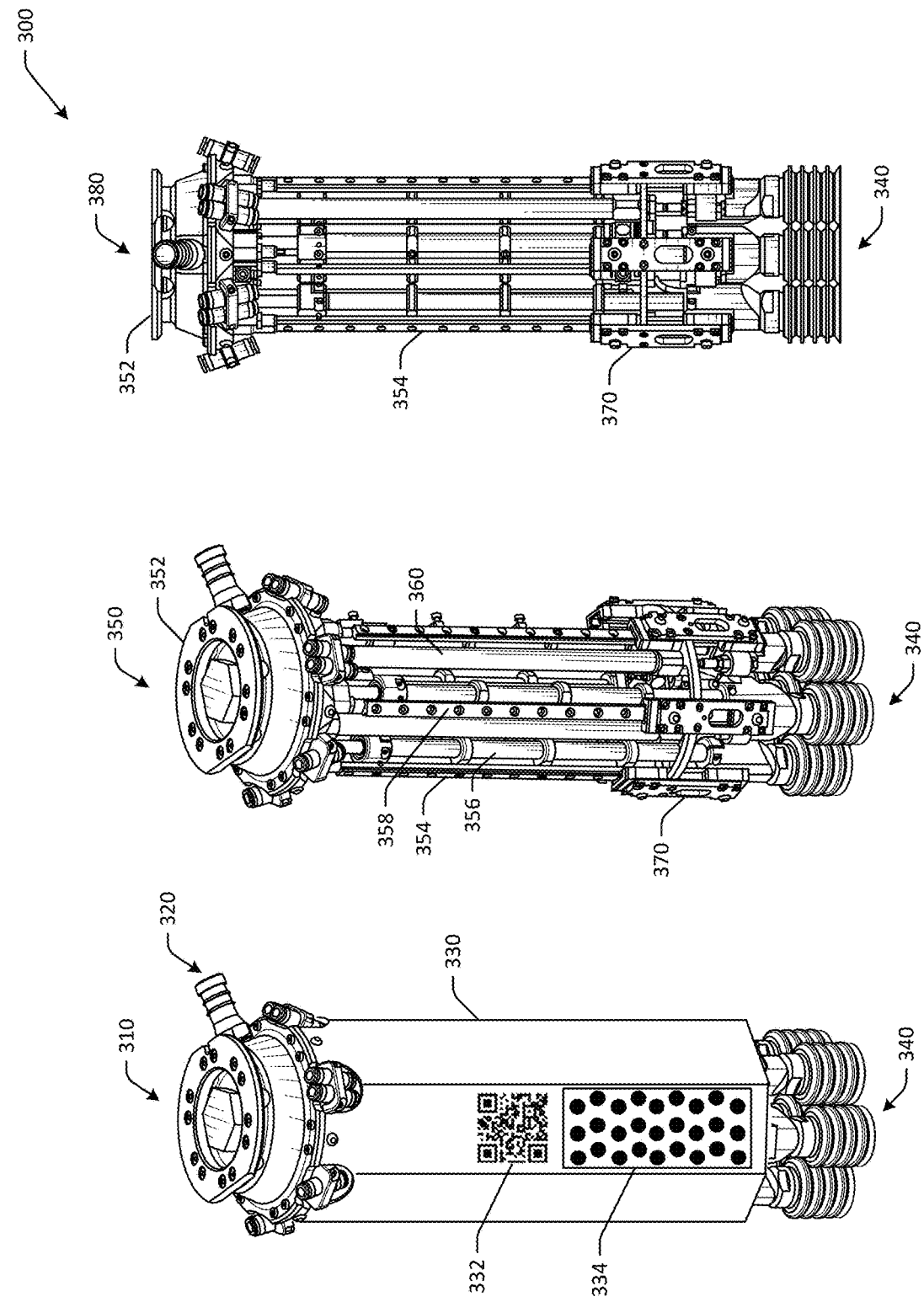
FIG. 3 is a schematic illustration of an example picking assembly on which one or more calibration patterns may be mounted in accordance with one or more embodiments of the disclosure.

FIG. 3 is a schematic illustration of an example picking assembly 300 on which one or more calibration plates may be mounted in accordance with one or more embodiments of the disclosure. Other embodiments may include additional or fewer components. The illustration of FIG. 3 is not to scale, and may not be illustrated to scale with respect to other figures. The picking assembly illustrated in FIG. 3 may be the same end of arm tool discussed with respect to FIGS. 1-2.

In FIG. 3, the picking assembly 300 may be an end of arm tool that is coupled to a robotic manipulator. The picking assembly 300 may be a suction-based tool that is used to grasp, move, and release items. The picking assembly 300 may be moved into position via a robotic manipulator. In a first perspective view 310, the picking assembly 300 is depicted with a shell or housing 330. In a second perspective view 350 and a front view 380, the picking assembly 300 is depicted without the housing 330. The housing 330 may be a housing that includes one or more flat surfaces. For example, the housing 330 may have a hexagonal shaped cross-sectional geometry, with six flat faces or flat surfaces. In other embodiments, different geometries may be used, some including one flat surface and others including multiple flat surfaces. As illustrated, the picking assembly 300 may include a number of individual piston subassemblies that may be arranged or otherwise disposed in a parallel arrangement. FIG. 3 depicts the parallel pistons in a retracted position.

Although one type of picking assembly is depicted in the example of FIG. 3, other embodiments may include calibration plates that are mounted on different types of picking assemblies that have at least one flat surface.

One or more components may be coupled to a flat surface of the housing 330. For example, in FIG. 3, a machine readable code 332, which may be a color correction pattern (e.g., which may include a white balance marker or pattern, neutral balance pattern, gray balance pattern, etc.) or other machine readable pattern, may be coupled to the flat surface of the housing 330. Other components, such as calibration plates, stickers, sheets, or other forms of calibration patterns may be coupled to the housing 330. The machine readable code 332 may be used to calibrate the robotic system by adjusting color balance settings or values of one or more cameras. For example, a controller associated with a robotic system may be configured to determine an image of the color correction pattern using a first camera, and may adjust a color balance of the first camera based at least in part on the first image.

For example, one or more calibration plates 334 may be coupled to the housing 330. The calibration plate 334 may be coupled to the flat surface of the housing 330. The calibration plate 334 may have a registered pattern, such as a number of circles of a particular size and/or arranged in a particular pattern. The pattern on the calibration plate 334 may be used in conjunction with one or more cameras to calibrate a robotic manipulator to which the picking assembly 300 is coupled. For example, images of the pattern on the calibration plate 334 may be captured and used, along with position information of the robotic manipulator (e.g., three-dimensional coordinates corresponding to a pose of the robotic manipulator at a time at which the image was captured, etc.), to calibrate the robotic manipulator.

The picking assembly 300 may be a picking assembly that includes the housing 330. The housing 330 may be formed of carbon fiber, plastic, aluminum, a composite material, or a different type of high strength low weight material and may be coupled to one or more guides 370 disposed inside the housing 330. The housing 330 may be coupled using one or more screws or other components. In some embodiments, the housing 330 may not be directly coupled to any of the piston subassemblies. The housing 330 may be a load bearing component, which may reduce stress on the piston subassemblies, and may improve a lifetime of the picking assembly 300. The picking assembly may include any number of suction cups 340. The suction cups 340 may be disposed adjacent to a lower end of the housing 330 in a retracted position. In other embodiments, the suction cup 340 may be disposed inside the housing 330 in the retracted position. The suction cups 340 may be compliant components that may be used to grasp objects of different shapes, sizes, and materials. Each individual suction cup 340 may have its own compliance to assist with item deformation. The picking assembly 300 may be lightweight to improve repeatability. For example, the picking assembly 300 may have a total weight of less than about 5 pounds, and individual piston subassemblies may have a weight of about 100 grams. In addition, the lifting capacity of the system is improved, as a reduced weight increases the amount of mass the robot can lift (e.g., the total lift capacity may be unchanged, but a heavier item can be lifted due to a reduced weight of the picking assembly, etc.) The housing 330 may improve rigidity of the picking assembly and may resist shearing or twisting of the piston subassemblies. The picking assembly 300 may include a number of airflow system connection adapters, such as a first adapter 320, and a second adapter 352 disposed at an upper end of the picking assembly 300. The picking assembly 300 may have an extendable length that is about 50% greater than a retracted length. For example, a retracted length may be about 300 millimeters, and an extended length may be about 450 millimeters, or about 18 inches, for an extendability of about 50%. Due to improved rigidity and structural integrity of the picking assembly 300, the picking assembly may have a weight-to-extended length ratio of between about 0.25 lb/inch and about 0.30 lb/inch. For example, at a weight of 5 pounds and extended length of 18 inches, the picking assembly 300 may have a weight-to-extended length ratio of 0.28 lb/inch. In an example embodiment, the picking assembly 300 may have a diameter of between about 4 inches and about 8 inches, which may correspond to a density proxy of the picking assembly. The improved strength and rigidity may provide the ability to lift relatively heavy items without damaging the picking assembly 300. In an example, objects weighing over 50 pounds may be lifted and moved using the picking assembly 300 while maintaining a slim profile and relatively tight spacing between adjacent suction cups and/or piston subassemblies. The reduced weight also improves repeatability and lifespan of the picking assembly, as well as the available lifting capacity of the system.

As depicted in the second perspective view 350, the picking assembly may include a first piston subassembly that has a first air cylinder 356, a first sliding rail 354 that slides outwards of the housing 330 relative to the first air cylinder 356, and a first suction cup. The first piston subassembly may be configured to independently actuate from a retracted position to an extended position. The picking assembly 300 may include a second piston subassembly that has a second air cylinder 360, a second sliding rail 358 that slides relative to the second air cylinder 360, and a second suction cup, where the second piston subassembly may also be configured to independently actuate from the retracted position to the extended position. Any number of piston subassemblies may be included. The respective air chambers may be fixed relative to the suction cups 340 and may be load bearing components.

The first guide plate 370 may be configured to guide the respective piston subassemblies and may have a first aperture for the first piston subassembly and a second aperture for the second piston subassembly, and so forth. The first guide plate 370 may be coupled to the piston subassemblies and/or the housing 330. The first air cylinder 356 may be configured to actuate the first piston subassembly responsive to air pressure at the first air cylinder 356, and the second air cylinder 360 may be configured to actuate the second piston subassembly responsive to air pressure at the second air cylinder 360. The first air cylinder 356 and the second air cylinder 360 may be load bearing air cylinders, and the housing 330 may be a load bearing shell. In some embodiments, some of the piston subassemblies, such as those along a perimeter of the picking assembly as determined in a bottom view may include one or more restrictors configured to restrict airflow, so as to direct airflow to one or more center suction cups.

Although illustrated as a single piston subassembly disposed in a center surrounded by six piston subassemblies disposed in a circular arrangement about the center piston subassembly, any number of piston subassemblies may be used, and any number of circular formations may be used. Other configurations, such as arrays, rectangles, random patterns, and other configurations of piston subassemblies may be included.

In some embodiments, the center piston subassembly may not include a restrictor (e.g., a disc or other component that restricts airflow, etc.), while other non-center piston subassemblies may include one or more restrictors configured to restrict airflow, so as to ensure airflow at the center piston subassembly. In an example embodiment, some or all of the set of piston subassemblies surrounding the center piston subassembly in FIG. 3 may include individual restrictors to restrict air flow to the respective suction cups of the set of piston subassemblies.

The picking assembly 300 may be coupled to a robotic arm or other device configured to move the picking assembly from a first location to a second location. The picking assembly 300 may be coupled to a vacuum suction system that is configured to generate negative pressure to pick up an item, and positive pressure to release the item. For example, the picking assembly 300 may be part of a robotic system that includes a robotic manipulator. The picking assembly 300 may be coupled to the robotic manipulator, and the picking assembly 300 may be configured to grasp and release items using suction. The picking assembly 300 may include a housing having a first flat surface. A first calibration plate, such as the calibration plate 334, may be rigidly coupled to the first flat surface of the housing. For example, the first calibration plate may be adhered, bolted, or otherwise secured to the first flat surface of the housing. The first calibration plate may have a first pattern. The robotic system may include one or more cameras, such as a first camera, configured to image the first calibration plate, and a controller configured to calibrate the robotic manipulator.

The first camera may be part may optionally be oriented downwards towards the picking assembly, and a second camera may be oriented upwards towards the picking assembly. The robotic system may include a third camera and a fourth camera oriented downwards towards the picking assembly, and a fifth camera and a sixth camera oriented upwards towards the picking assembly. Any number of cameras may be included. The controller may be configured to calibrate the robotic manipulator using images captured by one or more of the cameras, such as the first camera, the second camera, the third camera, the fourth camera, the fifth camera, and the sixth camera.

Figure 4:
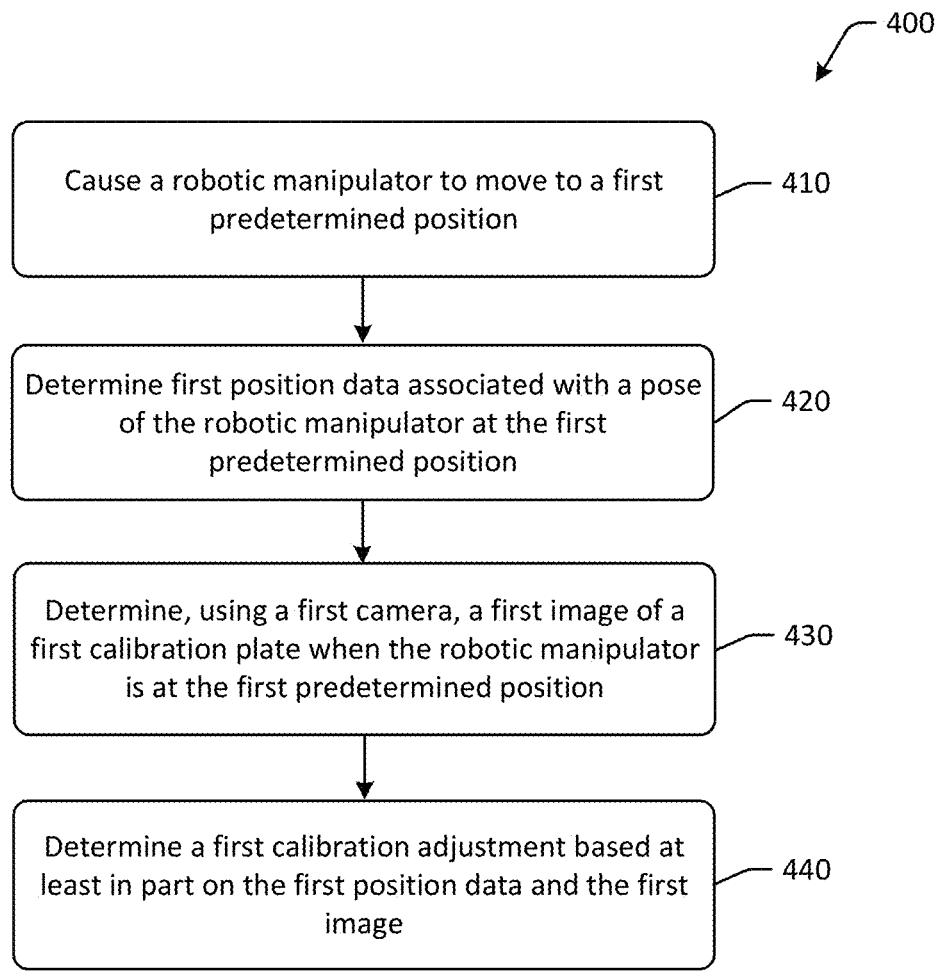
FIG. 4 is a schematic illustration of an example process flow for camera calibration and localization using robot-mounted registered patterns in accordance with one or more example embodiments of the disclosure.

FIG. 4 depicts an example process flow 400 for camera calibration and localization using robot-mounted registered patterns in accordance with one or more example embodiments of the disclosure. While example embodiments of the disclosure may be described in the context of robotic arm calibration, it should be appreciated that the disclosure is more broadly applicable to any type of robotic manipulator. Some or all of the blocks of the process flows in this disclosure may be performed in a distributed manner across any number of devices. The operations of the process flow 400 may be optional and may be performed in a different order.

In one example embodiment, the process flow 400 may be executed to determine calibration adjustments for a robotic arm and/or other components of a robotic system, such as camera calibration. Calibration adjustments account for differences between where the robotic arm is supposed to be positioned, and where the robotic arm is actually positioned. Calibration adjustments for cameras may include color correction and other features. Some embodiments may use images of one or more calibration plates rigidly mounted on an end of arm tool coupled to the robotic arm in order to determine calibration adjustments. Some embodiments may capture images during a dedicated calibration session (e.g., when the robotic arm is taken offline for normal tasks, etc.), whereas other embodiments may capture images during actual usage of the robotic arm, for on-the-move calibration without a dedicated calibration process. The process flow 400 may be used to calibrate the robotic manipulator and/or positioning of a picking assembly coupled to the robotic manipulator.

At block 410 of the process flow 400, computer-executable instructions stored on a memory of a device, such as a remote server or a user device, may be executed to cause a robotic manipulator to move to a first predetermined position. For example, a control module executed at a controller or computer system associated with a robotic system may cause a robotic manipulator to move to a first predetermined position. To calibrate the robotic manipulator, the controller may cause the robotic manipulator to move through a series of one or more predetermined positions or waypoints, at which images of a calibration plate coupled to the robotic manipulator may be captured. For example, the robotic manipulator may move the calibration plate through a number of predetermined positions and orientations (where "pose" refers to both a position and orientation), and may optionally stop briefly at the different positions to allow time for images of the calibration plate to be captured. The images may be used to determine an actual position of the robotic manipulator, and may be compared to position data and orientation data associated with the pose of the robotic manipulator at the time the image was captured to determine whether there are any discrepancies. If so, the robotic manipulator may need to undergo calibration via one or more calibration adjustments. Accordingly, the controller may cause the robotic manipulator to move to a first predetermined position and orientation, which may be in a two-dimensional or three-dimensional space, as discussed with respect to FIG. 5A.

At block 420 of the process flow 400, computer-executable instructions stored on a memory of a device, such as a remote server or a user device, may be executed to determine first position data associated with a pose of the robotic manipulator at the first predetermined position. For example, a control module executed at a controller or computer system associated with a robotic system may determine first position data and optional orientation data associated with a pose of the robotic manipulator at the first predetermined position. The first position data may be one or more sets of coordinates or other representations of the position and orientation of various parts of the robotic manipulator that form a pose. For example, a first set of coordinates may indicate positioning of a first arm member, a second set of coordinates may indicate positioning or rotation of a base, a third set of coordinates may indicate an angle of an end of arm tool joint, and/or other parts of the robotic manipulator.

In some embodiments, the first position data may be data related to a certain component of the robotic manipulator, and may be in a coordinate format, a range of coordinates, or other format. The controller may determine the first position data by determining the coordinates associated with one or more components of the robotic manipulator while the robotic manipulator is in a particular pose or configuration at the first predetermined position. In some embodiments, the first position data may be determined by querying a controller or other computer system associated with the robotic system.

At block 430 of the process flow 400, computer-executable instructions stored on a memory of a device, such as a remote server or a user device, may be executed to determine, using a first camera, a first image of the first calibration plate when the robotic manipulator is at the first predetermined position. For example, a control module executed at a controller or computer system associated with a robotic system may determine, using the first camera, a first image of the first calibration plate when the robotic manipulator is at the first predetermined position and optional orientation. The robotic system may include one or more cameras that may be used to determine or identify items, determine a path of movement for the robotic manipulator, calibrate the robotic manipulator, and so forth. Any number of cameras may be included. The cameras may be configured to capture images of the robotic manipulator at various points in time. During a dedicated calibration process, the first camera may be used to capture a first image of the first calibration plate after the robotic manipulator is positioned at the first predetermined position or first waypoint. In some embodiments, more than one camera may capture an image of the calibration plate at the first predetermined position and orientation. Further, in some instances, multiple images of the calibration plate may be captured by the first camera when the robotic manipulator is at the first predetermined position and orientation. In some embodiments, more than one calibration plate may be used, and different cameras may be used to capture images of the different calibration plates. For example, a pattern on a calibration plate may be configured to be imaged by a camera having a certain resolution, where different patterns are used for different resolution cameras. Moreover, in some embodiments, although the robotic manipulator may pause at a waypoint, the robotic manipulator may be configured to move the calibration plate via the end of arm tool across an entire field of view of a camera, such as the first camera. In some embodiments, more than one orientation of the robotic manipulator may be used at the same position, which may allow for more images to be captured and resulting in enhanced model data.

At block 440 of the process flow 400, computer-executable instructions stored on a memory of a device, such as a remote server or a user device, may be executed to determine a first calibration adjustment based at least in part on the first position data and the first image. For example, a control module executed at a controller or computer system associated with a robotic system may determine a first calibration adjustment based at least in part on the first position data and the first image. For example, the known position of the first camera, the position data, and the first image (and/or corresponding processing of the first image, etc.) may be used to determine whether there is a distance between the first position data and the position of the first predetermined position, and if so, whether the distance is to be offset with a calibration adjustment. For example, some embodiments may implement calibration adjustments after a threshold difference in expected position and actual position is exceeded, such as 1 millimeter. Other embodiments may implement calibration adjustments if a difference is detected. The first calibration adjustment may be a change in any one of two- or three-axes of movement, and may be used to correct the positioning of the robotic manipulator and/or picking assembly such that actual position corresponds to expected position (e.g., the first predetermined position, etc.). The process may be completed for more than one predetermined position, such as at different positions in a two dimensional space or a three dimensional space. In some embodiments, calibration adjustments may be determined based on multiple data points, such as feedback from a number of cameras and corresponding pose data, where the final calibration adjustment is optimized across all of the available feedback.

Accordingly, the robotic system may include a controller that is configured to calibrate positioning of a robotic manipulator and/or the picking assembly using a number of waypoints. For example, the controller may cause the robotic arm to move to a second predetermined waypoint, determine second position data associated with a pose of the robotic arm at the second predetermined waypoint, and may determine, using a second camera, a second image of the second calibration plate when the robotic arm is at the second predetermined waypoint. The camera may determine a second calibration adjustment based at least in part on the second position data and the second image. In some embodiments, the controller may be configured to cause the robotic manipulator to move the picking assembly across an entire field of view of the first camera and/or other cameras of the robotic system.

FIG. 5A is a schematic illustration of an example robotic system 500 performing camera calibration and localization using robot-mounted registered patterns, along with example calibration patterns, in accordance with one or more embodiments of the disclosure. Other embodiments may include additional or fewer components. The illustration of FIG. 5A is not to scale, and may not be illustrated to scale with respect to other figures. The components illustrated in FIG. 5A may be components of the robotic systems discussed with respect to FIGS. 1-4.

In FIG. 5A, the robotic system 500 may include a robotic manipulator 510, such as a robotic arm. An end of arm tool, such as a picking assembly 570, may be coupled to the robotic manipulator 510. The robotic system 500 may operate in a partially enclosed space, such as a fenced off environment. A number of cameras may be positioned about the robotic manipulator 510. For example, a first camera 560 may be oriented downwards towards the picking assembly 570 of the robotic system 500, a second camera 562 may be oriented downwards towards the picking assembly 570, a third camera 564 may be oriented horizontally, a fourth camera 566 may be oriented upwards towards the picking assembly 570, a sixth camera 550 may be oriented downwards towards the picking assembly 570, and so forth. Any number of cameras may be used. Some embodiments may include arrays of cameras instead of standalone cameras.

Figure 5B:
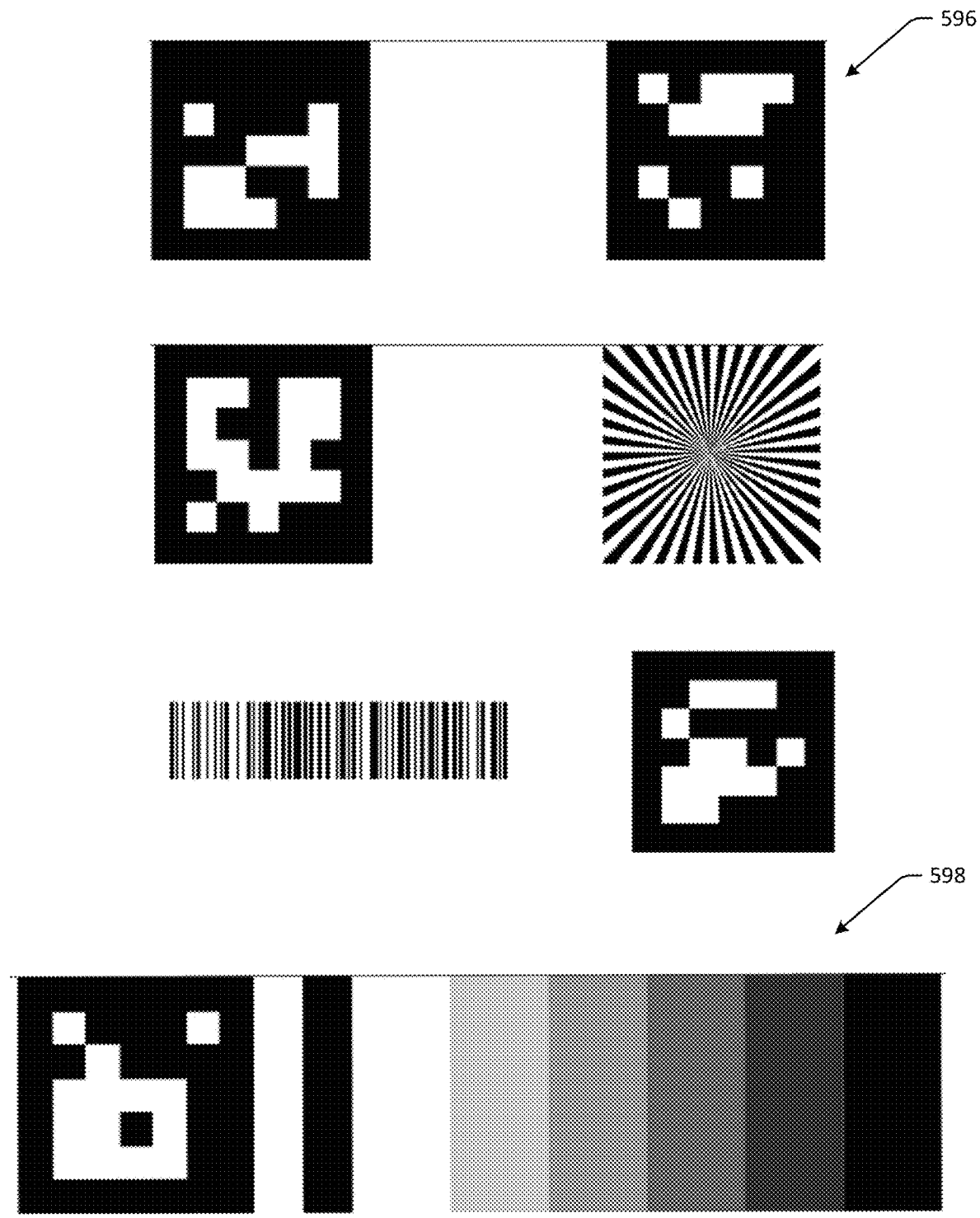
FIG. 5B is a schematic illustration of additional robot-mounted calibration patterns in accordance with one or more embodiments of the disclosure.

One or more calibration plates may be coupled to the picking assembly 570. For example, as depicted in close-up view 580 of the picking assembly 570, a first calibration plate 590 may be coupled to a first flat face of the picking assembly 570, and a second calibration plate 592 may be coupled to a second flat face of the picking assembly 570. The first calibration plate 590 may have a first pattern, and the second calibration plate 592 may have a second pattern. In some embodiments, the first pattern and the second pattern may be the same pattern, whereas in other embodiments, the first pattern and the second pattern may be different, as depicted in the example of FIG. 5A. Another example of a third calibration plate 594 is depicted in FIG. 5A and includes a color correction pattern 596 (additional examples of color correction patterns are depicted in FIG. 5B). Any number of calibration patterns and/or calibration markers may be used. The patterns may be registered patterns used for calibration when imaged by respective cameras. In embodiments where multiple patterns and/or calibration plates are used, the different patterns may be configured for imaging by cameras at different resolutions. For example, the first camera 560 may have a first resolution, and the second camera 562 may have a second resolution. The first pattern of the first calibration plate 590 may be configured for imaging at the first resolution, and the second pattern of the second calibration plate 592 may be configured for imaging at the second resolution.

During calibration, the robotic manipulator 510 may move the picking assembly 570 to a number of predetermined positions in space. The predetermined positions may serve as waypoints. Once the robotic manipulator 510 is at a particular waypoint, position data associated with a pose of the robotic manipulator 510 (which represents an expected position of the robotic manipulator 510) may be compared to an actual position of the robotic manipulator 510 as determined based at least in part on images of one or more of the calibration plates coupled to the picking assembly, where the images are captured by one or more of the cameras. The predetermined positions may be at the same or different positions along a vertical axis. For example, a first set of nine predetermined positions 520 may be at a first vertical height, and a second set of nine predetermined positions 530 may be at a second vertical height. The robotic manipulator 510 may move the picking assembly 570 through the different predetermined positions at the different vertical heights, while the cameras image the first and/or second calibration plates. A third set of predetermined positions 540 may be disposed at a different location, such as over destination totes, and may be imaged by the sixth camera 550. The predetermined points are represented as circles in the example of FIG. 5A, and are actually positions in space to which the robotic manipulator 510 may guide the picking assembly 570. Any number or arrangement of predetermined positions may be used.

FIG. 5B is a schematic illustration of additional robot-mounted calibration patterns in accordance with one or more embodiments of the disclosure. The examples of FIG. 5B may be used instead of, or in conjunction with, any of the calibration patterns and/or color correction patterns discussed herein, such as those discussed with respect to FIGS. 1-5A. A first group of example calibration patterns 596 may include one or more different types of markers that form patterns recognized by cameras. The different markers may be in the form of machine readable codes, such as barcodes, QR codes, etc., or in different forms, such as those depicted in the example of FIG. 5B. Any suitable type of pattern may be used. Similarly, some embodiments may include color correction patterns, such as a color correction pattern 598 illustrated in FIG. 5B, which may be used in conjunction with a calibration pattern. As described herein, any number of patterns may be disposed on the end of arm tool and used to calibrate a robotic system, such as calibration of a robotic manipulator, calibration of one or more cameras, or other components of the robotic system.

Figure 6:
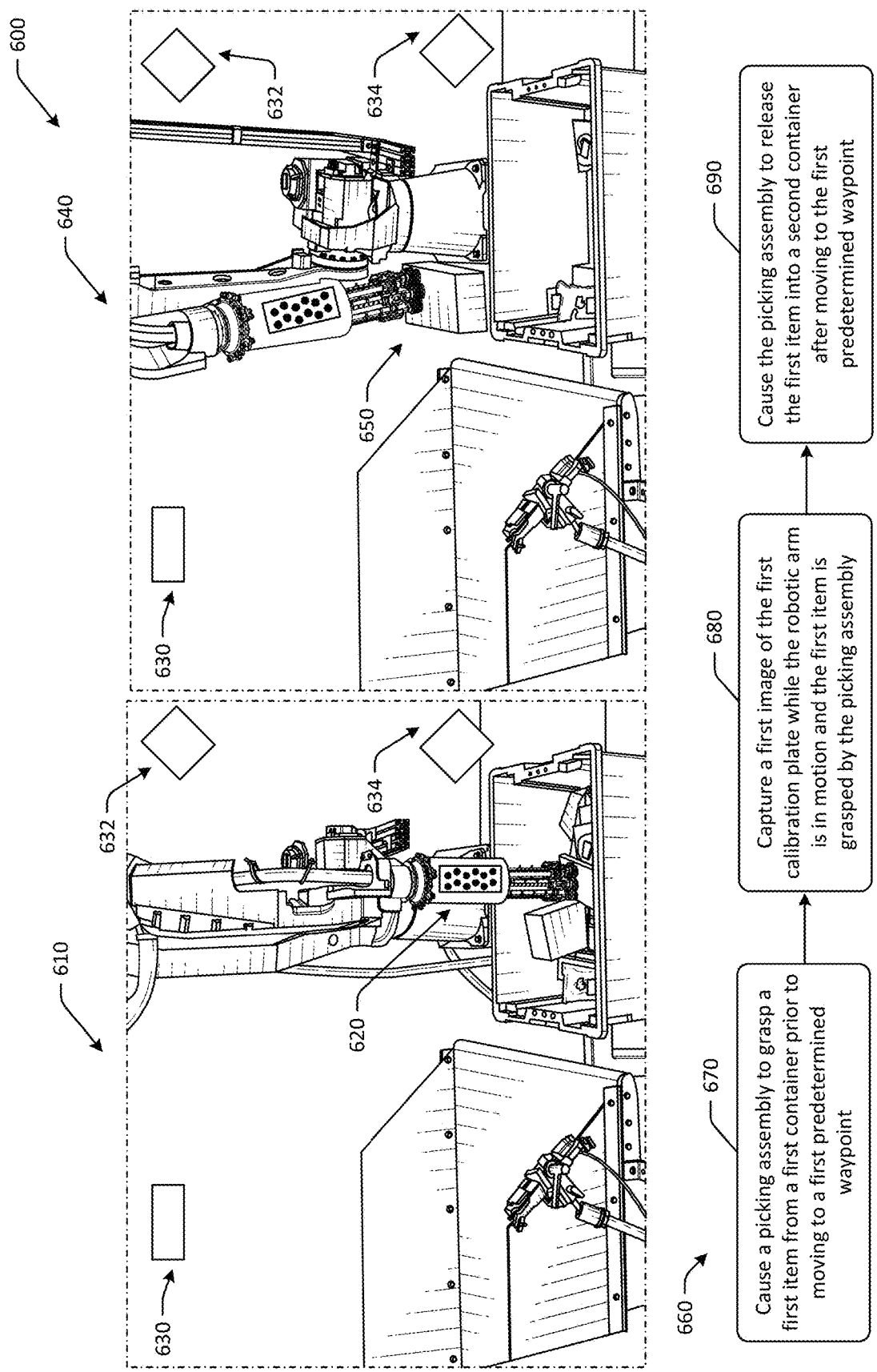
FIG. 6 is a schematic illustration of an example robotic system performing camera calibration and localization using robot-mounted registered patterns while carrying an item in accordance with one or more embodiments of the disclosure.

FIG. 6 is a schematic illustration of an example robotic system 600 performing camera calibration and localization using robot-mounted registered patterns while carrying an item in accordance with one or more embodiments of the disclosure. Other embodiments may include additional or fewer components. The illustration of FIG. 6 is not to scale, and may not be illustrated to scale with respect to other figures. The components illustrated in FIG. 6 may be components of the robotic system discussed with respect to FIGS. 1-5B.

In FIG. 6, a robotic picking assembly 620 may be used to pick up objects of various form factors and with different packaging materials (e.g., loose plastic bag packaging, boxes, etc.), as well as objects of different sizes and shapes, such as cylindrical objects, round objects, etc. To accurately and repeatedly grasp items in cluttered environments, embodiments may include picking tools with suction cups and parallel pistons. Individual pistons may be actuated depending on an amount of a target item (e.g., an item that is targeted for grasping, etc.) that is exposed, the shape and/or size of the target item, etc. The individual pistons may provide added flexibility in movement of the robotic arm or other device to which the picking assembly is coupled, such as a gantry or other device. Different shapes and configurations may be formed via the individual pistons that are actuated to an extended position. For example, a row of piston subassemblies and corresponding suction cups may be extended, an arc, semicircle, or circle of piston subassemblies and corresponding suction cups may be extended, individual piston subassemblies and corresponding suction cups may be extended, and so forth, based at least in part on imaging data indicative of a positioning and/or exposure of a target item (e.g., for instances where the target item is in a cluttered environment, etc.).

At a first instance 610, the robotic picking assembly 620 may be used to grasp an item from a number of items in a container. The robotic picking assembly 620 may be operated in an environment with a number of cameras, such as a first camera 632, a second camera 634, and a third camera 630. As depicted at a second instance 640, the robotic picking assembly 620 may grasp the item 650 and may move the item to another container.

While the robotic picking assembly 620 is in operation, some embodiments may be configured to calibrate one or more components of the robotic picking assembly 620, such as the robotic arm. For example, a calibration plate may be coupled to a housing of the robotic picking assembly 620. One or more of the cameras may image the calibration plate as the robotic picking assembly 620 moves across a field of view of the respective camera.

The controller may therefore be configured to calibrate the robotic manipulator while the robotic manipulator is moving, and while the picking assembly is grasping an item. For example, the controller may execute a process flow 660 to calibrate the robotic picking assembly 620 during usage. At block 670, the controller may cause the picking assembly to grasp a first item from a first container prior to moving to the first predetermined waypoint. At block 680, the controller may cause a first image of the first calibration plate to be captured while the robotic arm is in motion and the first item is grasped by the picking assembly. At block 690, the controller may cause the picking assembly to release the first item into a second container after moving to the first predetermined waypoint. After a critical mass of images are captured by a particular camera of the calibration plate, such as images as the calibration plate moves across some or all of a width of a field of view of the camera, the controller may determine one or more calibration adjustments based on the image data, as well as position data representing positioning of the robotic picking assembly 620 and/or robotic arm at the time the image was captured. Accordingly, calibration can take place without a dedicated calibration cycle, and while the robotic picking assembly 620 is in usage.

Figure 7:
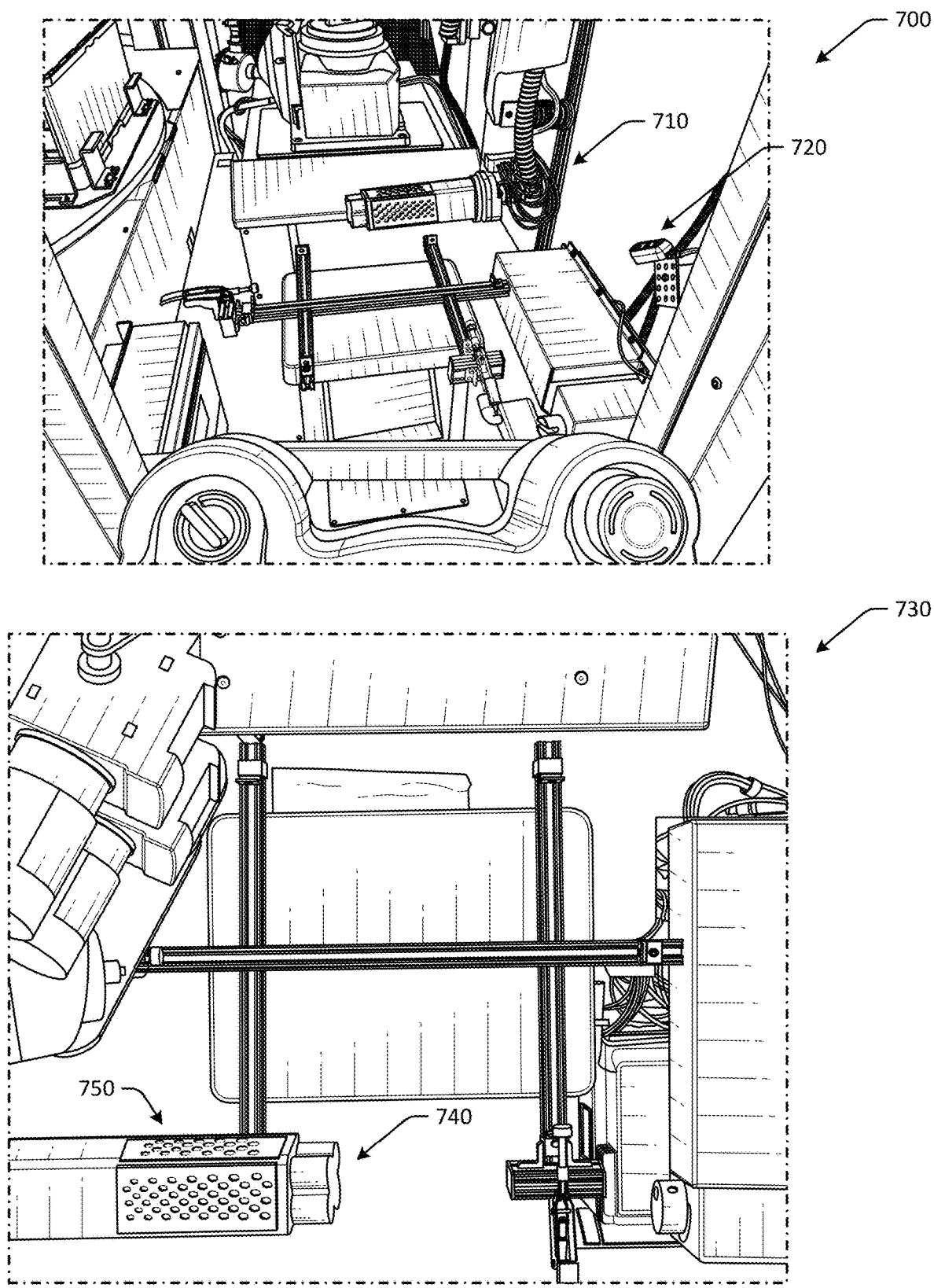
FIG. 7 is a schematic illustration of an example use case for robotic system camera calibration and localization using robot-mounted registered patterns in accordance with one or more embodiments of the disclosure.

FIG. 7 is a schematic illustration of an example use case for robotic system camera calibration and localization using robot-mounted registered patterns in accordance with one or more embodiments of the disclosure. Other embodiments may include additional or fewer components. The illustration of FIG. 7 is not to scale, and may not be illustrated to scale with respect to other figures. The components illustrated in FIG. 7 may be components of the robotic system discussed with respect to FIGS. 1-6.

In FIG. 7, a robotic system 700 is depicted with a robotic manipulator 710 moving in an environment and camera 720 oriented upwards. The robotic manipulator 710 may be coupled to a picking assembly 740. Due to the positioning of the picking assembly 710, a calibration plate 750 mounted on the picking assembly 740 is not within a field of view of the camera 720, as depicted in top view 730. However, as the robotic manipulator 710 moves during movement of items, the calibration plate 750 may eventually pass through the field of view of the camera 720, thereby allowing the camera 720 to capture images of the calibration plate 720. Such images can then be aggregated in conjunction with position data and used to calibrate the robotic manipulator 710 or robotic system on the go, without dedicated calibration processes and/or downtime. In other instances, the images can then be aggregated in conjunction with position data and used to validate (instead of calibrate) the robotic manipulator 710 or robotic system on the go. Validation may include confirmation that calibration adjustments are not needed at a particular point in time, and may be performed in less time than that needed for calibration.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

ILLUSTRATIVE COMPUTER ARCHITECTURE

Figure 8:
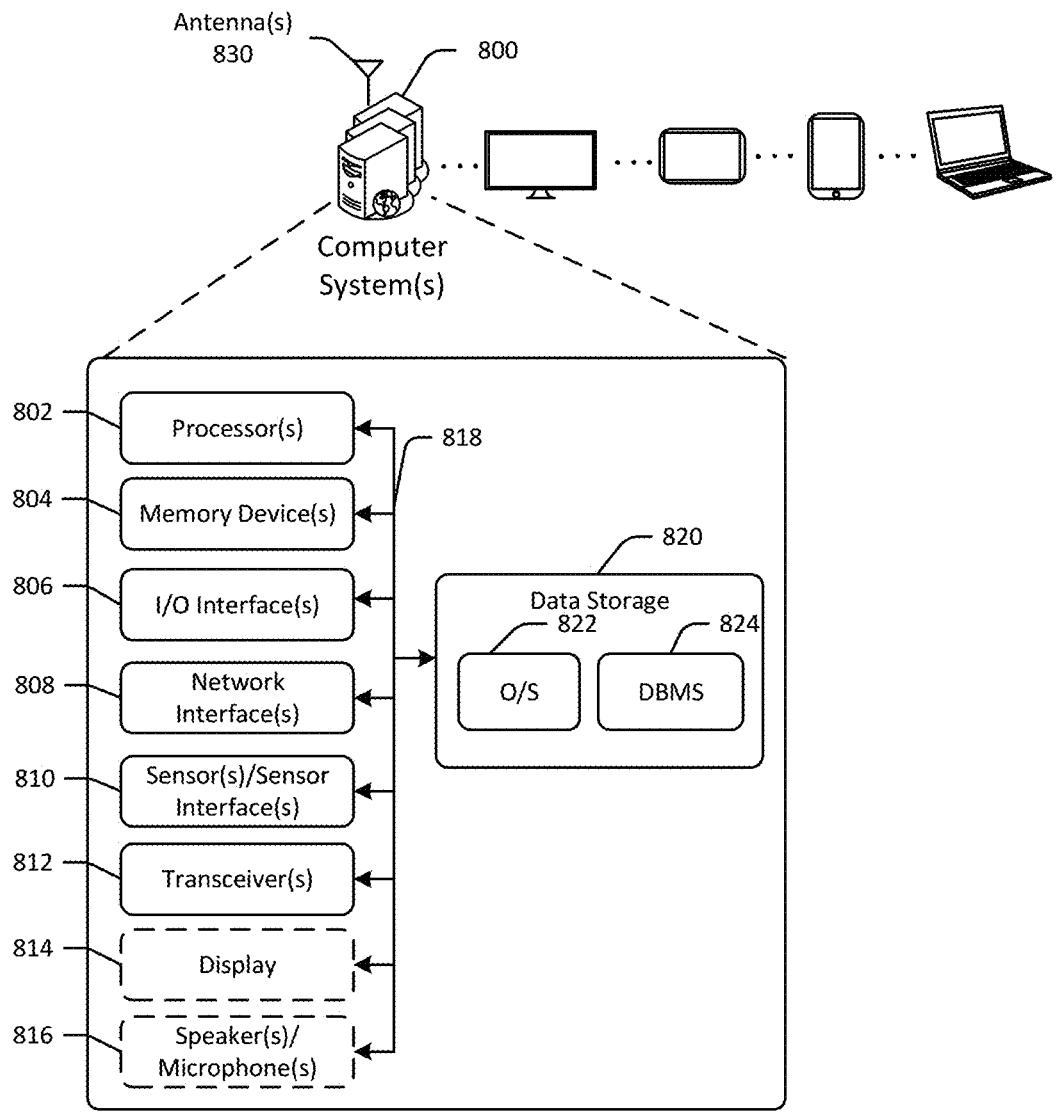
FIG. 8 schematically illustrates an example architecture of a computer system associated with an item picking system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the device(s) of FIGS. 1-7. For example, the computer system(s) 800 may control one or more aspects of the robotic system camera calibration and localization using robot-mounted registered patterns described in FIGS. 1-7, such as determining camera images, determining calibration adjustments, determining which piston subassemblies to extend or retract, where a robotic arm or other device is to position a picking assembly, and so forth.

The computer system(s) 800 may be configured to communicate with one or more servers, user devices, or the like. The computer system(s) 800 may be configured to identify items, retrieve items, move items, calibrate the robotic manipulator, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3 G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3 G standards (e.g., Universal Mobile Telecommunications System (UMTS), Wideband Code Division Multiple Access (W-CDMA), CDMA2000, etc.), 4 G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic system comprising:
   a vacuum suction system configured to provide negative air pressure;
   a robotic arm;
   a picking assembly coupled to the vacuum suction system and the robotic arm, the picking assembly configured to grasp and release objects, wherein the picking assembly comprises a shell having a hexagonal cross-sectional geometry, such that six flat faces are formed on an external surface of the shell;
   a first calibration plate rigidly mounted to a first face of the shell, the first calibration plate having a first pattern disposed thereon, wherein the first calibration plate is non-reflective;
   a second calibration plate rigidly mounted to a second face of the shell, the second calibration plate having a second pattern disposed thereon, wherein the second calibration plate is non-reflective;
   a first camera oriented towards the robotic arm at a downwards angle relative to horizontal;
   a second camera oriented towards the robotic arm at an upwards angle relative to horizontal; and
   a controller configured to calibrate positioning of the picking assembly by:
      causing the robotic arm to move to a first predetermined waypoint;
      determining first position data and first orientation data associated with a pose of the robotic arm at the first predetermined waypoint;
      determining, using the first camera, a first image of the first calibration plate when the robotic arm is at the first predetermined waypoint;
      determining a first calibration adjustment based at least in part on the first position data, the first orientation data, and the first image, wherein the first calibration adjustment includes an adjustment to at least one coordinate associated with the first predetermined waypoint, and wherein the adjustment causes a change in physical position;
      causing the robotic arm to move to a second predetermined waypoint;
      determining second position data and second orientation data associated with a pose of the robotic arm at the second predetermined waypoint;
      determining, using the second camera, a second image of the second calibration plate when the robotic arm is at the second predetermined waypoint; and
      determining a second calibration adjustment based at least in part on the second position data, the second orientation data, and the second image.

2. The robotic system of claim 1, wherein the first camera has a first resolution, and the second camera has a second resolution; and
   wherein the first pattern is configured for imaging at the first resolution, and the second pattern is configured for imaging at the second resolution.

3. The robotic system of claim 1, wherein the controller is further configured to:
   cause the picking assembly to grasp a first item from a first container prior to moving to the first predetermined waypoint, wherein the first image of the first calibration plate is captured while the robotic arm is in motion and the first item is grasped by the picking assembly; and
   cause the picking assembly to release the first item into a second container after moving to the first predetermined waypoint.

4. A robotic system comprising:
   a robotic manipulator;
   a picking assembly coupled to the robotic manipulator, the picking assembly configured to grasp and release items, wherein the picking assembly comprises a housing having a first flat surface;
   a first calibration pattern disposed on the first flat surface of the housing;
   a first camera configured to image the first calibration pattern; and
   a controller configured to calibrate the robotic system by:
      causing the robotic manipulator to move to a first predetermined position;
      determining first position data associated with a pose of the robotic manipulator at the first predetermined position;
      determining, using the first camera, a first image of the first calibration pattern when the robotic manipulator is at the first predetermined position; and
      determining a first calibration adjustment based at least in part on the first position data and the first image, wherein the first calibration adjustment includes an adjustment to at least one coordinate associated with the first predetermined position, and wherein the adjustment causes a change in physical position.

5. The robotic system of claim 4, wherein the housing comprises a second flat surface, the robotic system further comprising:
   a second calibration pattern disposed on the second flat surface of the housing; and
   a second camera configured to image the second calibration pattern;
   wherein the controller is configured to calibrate the robotic system using images captured by the first camera and the second camera.

6. The robotic system of claim 5, wherein the first camera has a first resolution, and the second camera has a second resolution; and
   wherein the first calibration pattern is configured for imaging at the first resolution, and the second calibration pattern is configured for imaging at the second resolution.

7. The robotic system of claim 5, wherein the first camera is oriented downwards towards the picking assembly, and the second camera is oriented upwards towards the picking assembly, the robotic system further comprising:
   a third camera and a fourth camera oriented downwards towards the picking assembly; and
   a fifth camera and a sixth camera oriented upwards towards the picking assembly;
   wherein the controller is configured to calibrate the robotic system using images captured by the first camera, the second camera, the third camera, the fourth camera, the fifth camera, and the sixth camera.

8. The robotic system of claim 4, wherein the housing comprises a second flat surface, the robotic system further comprising:

a second calibration pattern disposed on the second flat surface of the housing, wherein the second calibration pattern is different than the first calibration pattern; and wherein the controller is configured to calibrate the robotic system using images of the first calibration pattern and the second calibration pattern captured by the first camera.

9. The robotic system of claim 4, wherein the controller is further configured to:

cause the robotic manipulator to move the picking assembly across an entire field of view of the first camera.

10. The robotic system of claim 4, wherein the first position data comprises position data and orientation data.

11. The robotic system of claim 4, wherein the controller is configured to calibrate the robotic system while the robotic manipulator is moving, and while the picking assembly is grasping an item.

12. The robotic system of claim 4, wherein the controller is configured to validate the robotic system while the robotic manipulator is moving.

13. The robotic system of claim 4, further comprising:

a color correction pattern disposed adjacent to the first calibration pattern.

14. The robotic system of claim 13, wherein the controller is further configured to:

determine an image of the color correction pattern using the first camera; and adjust a color balance of the first camera based at least in part on the image.

15. A robotic picking system comprising:

a robotic arm;

a picking assembly coupled to the robotic arm, the picking assembly comprising a housing having a first flat surface and a second flat surface;

a first calibration pattern disposed on the first flat surface of the housing;

a second calibration pattern disposed on the second flat surface of the housing;

a first camera configured to image the first calibration pattern and the second calibration pattern; and a controller configured to calibrate the robotic picking system by:

causing the robotic manipulator to move to a first predetermined position;

determining first position data associated with a pose of the robotic manipulator at the first predetermined position;

determining, using the first camera, a first image of the first calibration pattern when the robotic manipulator is at the first predetermined position; and determining a first calibration adjustment based at least in part on the first position data and the first image, wherein the first calibration adjustment includes an adjustment to at least one coordinate associated with the first predetermined position, and wherein the adjustment causes a change in physical position.

16. The robotic picking system of claim 15, wherein the first pattern is different than the second pattern.

17. The robotic picking system of claim 15, wherein the housing is a load bearing housing.

\* \* \* \* \*